United States Patent
Sayama et al.

(10) Patent No.: US 6,499,649 B2
(45) Date of Patent: Dec. 31, 2002

(54) FRICTION STIR WELDING APPARATUS

(75) Inventors: Mitsuru Sayama, Saitama (JP); Tsutomu Kobayashi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/909,798

(22) Filed: Jul. 23, 2001

(65) Prior Publication Data

US 2002/0027153 A1 Mar. 7, 2002

(30) Foreign Application Priority Data

Sep. 1, 2000 (JP) ........................................ 2000-264935

(51) Int. Cl.[7] .............................................. B23K 20/12
(52) U.S. Cl. ...................................... 228/112.1; 228/2.1
(58) Field of Search ................................. 228/112.1, 2.1

(56) References Cited

U.S. PATENT DOCUMENTS

| | | | |
|---|---|---|---|
| 5,893,507 A | | 4/1999 | Ding et al. |
| 6,050,475 A | * | 4/2000 | Kinton et al. |
| 6,168,066 B1 | * | 1/2001 | Arbegast |
| 6,199,745 B1 | * | 3/2001 | Campbell et al. |
| 6,237,835 B1 | * | 5/2001 | Litwinski et al. |
| 6,247,634 B1 | * | 6/2001 | Whitehouse |
| 6,299,050 B1 | * | 10/2001 | Okamura et al. |
| 6,302,315 B1 | * | 10/2001 | Thompson |
| 6,325,273 B1 | * | 12/2001 | Boon et al. |

FOREIGN PATENT DOCUMENTS

| | | |
|---|---|---|
| EP | 0968788 A2 * | 1/2000 |
| JP | 9-508073 | 8/1997 |
| JP | 10-156557 | 6/1998 |
| JP | 02002066763 A * | 3/2002 |

OTHER PUBLICATIONS

US 2002/0027155 A1 Okamura et al. (Mar. 7, 2002).*
US 2002/0027153 A1 Sayama et al. (Mar. 7, 2002).*

* cited by examiner

*Primary Examiner*—Tom Dunn
*Assistant Examiner*—Kiley Stoner
(74) *Attorney, Agent, or Firm*—Armstrong, Westerman & Hattori, LLP

(57) ABSTRACT

A friction stir welding apparatus includes a rotary tool for friction stir welding, a spindle motor of a rotational driving unit for rotationally driving the rotary tool when the rotary tool is mounted on the rotational driving unit, a servo motor of a press driving unit for pressing the shank of the rotary tool against the surface of a portion to be butt welded when the rotational driving unit is mounted on the press driving unit, a mount bracket for supporting the press driving unit, a pressure sensor for detecting a pressing force exerted on the surface of the portion to be butt welded by the shank, and a control unit for controlling the driving of the servo motor such that the pressing force falls within a predetermined range based on a detection signal sent from the pressure sensor.

8 Claims, 3 Drawing Sheets

FRICTION STIR WELDING APPARATUS

BACKGROUND OF THE INVENTION

1. Field of the Invention

The present invention relates to a friction stir welding apparatus for softening a portion of a plate-like member which is to be butt welded through friction heat generated by an advancing rotary tool so that the portion being softened is plastically fluidized in the rear of the advancing rotary tool, whereby the portion to be butt welded is allowed to be welded to another member when cooled and solidified.

2. Description of the Related Art

A method and apparatus which are described, respectively, in JP-W-9-508073 and JP-A-10-156557 are conventionally known as a method and apparatus for butt welding a plate-like member of relatively soft aluminum alloy. According to the principle of a friction stir welding method and apparatus of this kind, generally a steel rotary tool which is harder than the plate-like member is moved along a line extending along a portion of the plate-like member which is to be butt welded, that is, which is to be butt joined by welding (hereinafter referred to as "welding portion") while being rotationally driven so as to soften the welding portion by virtue of friction heat generated by the rotary tool so that the portion being softened is plastically fluidized in the rear of the moving rotary tool, whereby the welding portion is allowed to be welded to another member when cooled and solidified.

In the friction stir welding apparatus as described above, the rotary tool has a shank adapted to be brought into abutment with the surface of the welding portion of the plate-like member and a probe provided in such a manner as to protrude from the shank and be inserted into the welding portion for frictional rotating contact therewith. The rotary tool is formed substantially into a stepped column shape with the shank and the probe. The friction stir welding apparatus having the rotary tool so constructed normally comprises an electric motor for rotationally driving the rotary tool which is mounted thereon with a chuck and a ball screw type positioning mechanism having the electric motor mounted thereon for bringing the shank of the rotary tool into abutment with the surface of the welding portion of the plate-like member.

Incidentally, the positioning mechanism in the conventional friction stir welding apparatus has only a function to simply position the shank of the rotary tool so that the shank is brought into abutment with the surface of the welding portion of the plate-like member. Therefore, in a case where the welding portion of the plate-like member is flat and constant in thickness, the amount of insertion of the probe into the welding portion can be maintained constant. However, in a case where the welding portion is not flat or variable in thickness, the amount of insertion of the probe varies and as a result, it becomes difficult to weld the welding portion stably and accurately.

In addition, in a case where the conventional friction stir welding apparatus is mounted on an arm of a machining robot so as to weld the welding portion of the plate-like member while the probe of the friction stir welding apparatus is being moved linearly along the line of the welding portion by driving the arm, since the arm is generally driven by a plurality of servo motors, the accuracy with which the arm is re-positioned is inconstant, and it becomes difficult for the arm to hold the probe at a position at a desired height. Consequently, in this case, too, the amount of insertion of the probe into the welding portion varies and as a result, it becomes difficult to weld the welding portion stably and accurately.

SUMMARY OF THE INVENTION

Thus, an object of the invention is to provide a friction stir welding apparatus which can allow a shank of a rotary tool to follow the surface of a welding portion of a plate-like member even if the surface of the welding portion is irregular and the thickness of the same portion varies to thereby maintain constant the amount of insertion of a probe into the welding portion and which can perform a good welding operation, in particular, when mounted on an arm of a machining robot.

With a view to attaining the object, according to the invention, there is provided a friction stir welding apparatus including: a rotary tool for friction stir welding having a shank adapted to be brought into abutment with the surface of a portion of a plate-like member which is to be butt welded and a probe adapted to be inserted into the portion to be butt welded for frictionally rotating contact therewith; a rotational driving unit on which the rotary tool is mounted, the rotational driving unit rotationally driving the rotary tool; a press driving unit on which the rotational driving unit is mounted, the press driving unit pressing the shank of the rotary tool against the surface of the portion to be butt welded; a mount bracket supporting the press driving unit; a pressure sensor detecting a pressing force exerted on the surface of the portion to be butt welded by the shank of the rotary tool; and a control unit controlling the driving of the press driving unit such that the pressing force falls within a predetermined range based on a detection signal sent from the pressure sensor.

In the friction stir welding apparatus according to the invention, the rotational driving means rotationally drives the rotary tool, and the press driving means inserts the probe of the rotary tool into the welding portion of the plate-like member so that the shank of the rotary tool is pressed against the surface of the welding portion. In this state, when the friction stir welding apparatus moves relative to the plate-like member linearly along the line of the welding portion, the probe of the rotary tool is brought into a frictional rotating contact with the welding portion to thereby soften the same portion by virtue of friction heat generated by the frictional rotating contact, whereby the portion being softened starts to be plastically fluidized in the rear of the moving probe, and the welding portion is butt welded when cooled and solidified.

As this occurs, in the friction stir welding apparatus according to the invention, the pressure sensor detects the pressing force of the shank of the rotary tool relative to the surface of the welding portion of the plate-like member, and the control means controls the driving of the press driving means so that the pressing force of the shank falls within the predetermined range based on the detection signal from the pressure sensor. Consequently, the shank of the rotary tool can follow the surface of the welding portion even if the surface of the welding portion of the plate-like member has irregularities or the same portion varies in thickness, whereby the amount of insertion of the probe into the welding portion can maintain constant.

In the friction stir welding apparatus according to the invention, in a case where the mount bracket is constructed so as to be mounted on an arm of a machining robot, the welding portion can be butt welded by mounting the mount bracket on the arm of the machining robot and driving the arm so that the probe of the rotary tool moves along the welding portion of the plate-like member. As this occurs, since the amount of insertion of the probe of the rotary tool into the welding portion of the plate-like member is maintained constant, even if the accuracy with which the arm of the machining robot is re-positioned is inconstant, the machining robot only has to drive the arm linearly along the line of the welding portion.

In the friction stir welding apparatus according to the invention, in a case where there is provided a mount plate for fixing the rotational driving means to the press driving means for imparting the pressing force to the shank of the rotary tool, the pressure sensor can be held between the mount plate and the rotational driving means. In this case, it is preferable to use a piezoresistant element or a piezoelectric polymer as the pressure sensor.

In addition, in the friction stir welding apparatus according to the invention, while the rotational driving means normally uses an electric motor as a driving source, a hydraulic motor may be used as the driving source. Additionally, while the press driving means can be constituted by a ball screw mechanism adapted to be driven by the electric motor, the press driving means may be constituted by a linear actuator, a pneumatic cylinder, a hydraulic cylinder or the like.

DETAILED DESCRIPTION OF THE PREFERRED EMBODIMENTS

Referring to the appended drawings, an embodiment of a friction stir welding apparatus according to the invention will be described below.

Figure 1:
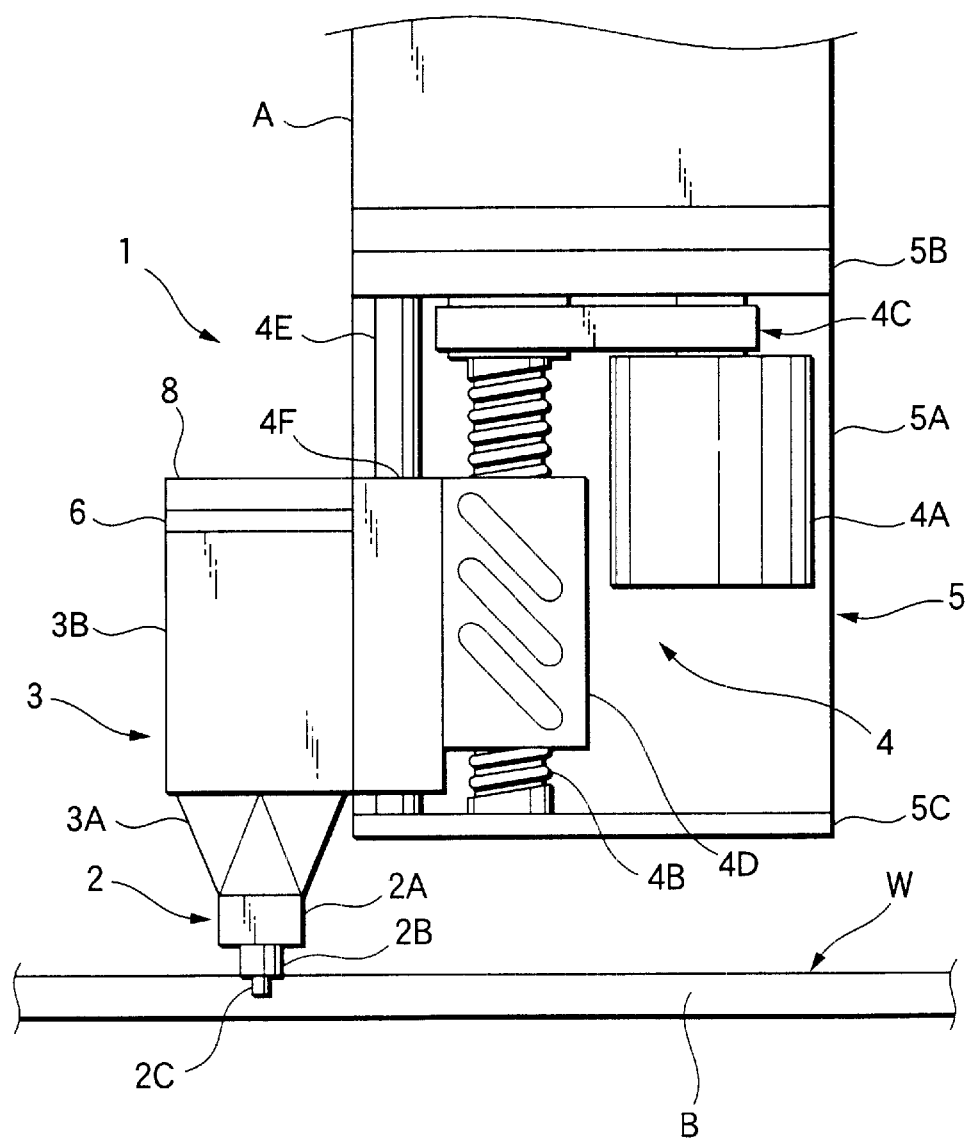
FIG. 1 is a schematic side view showing the construction of a friction stir welding apparatus according to one embodiment of the invention.

As shown in FIG. 1, a frictional stir welding apparatus 1 according to an embodiment of the invention is an apparatus for welding a welding portion of a plate-like member of, for example, aluminum alloy. The apparatus 1 includes a rotary tool 2 for friction stir welding, a rotational driving unit 3 for rotationally driving the rotary tool 2, a press driving unit 4 having the rotational driving unit 3 mounted thereon for pressing the rotary tool 2 against the surface of a welding portion B of a plate-like workpiece W, and amount bracket 5 for supporting the press driving unit 4. In addition, the friction stir welding apparatus 1 further includes a pressure sensor 6 for detecting the pressing force of the rotary tool 2 relative to the plate-like workpiece W and a control unit 7 for controlling the driving of the press driving unit 4 so that the pressing force falls within a predetermined range based on a detection signal from the pressure sensor 6 (refer to FIG. 2).

The rotary tool 2 is made of steel which is harder than the plate-like workpiece W made of aluminum alloy and is formed substantially into a stepped column shape having a grip portion 2A adapted to be gripped by a chuck, which will be described later, a shank 2B provided on the grip portion 2A in such manner as to protrude from a distal end face thereof to thereby be pressed against the surface of the welding portion B of the plate-like workpiece W and a probe 2C provided on the shank 2B in such a manner as to protrude from a distal end face thereof to thereby be inserted into the welding portion B. The rotary tool 2 is caused to travel along the line of the welding portion B of the plate-like workpiece W while being rotationally driven at a high speed of 2000 to 5000 rpm so that the probe 2C softens the welding portion B by virtue of friction heat to thereby allow the portion being so softened to be plastically fluidized in the rear of the traveling probe 2C, whereby the welding portion B is welded when cooled and solidified.

The rotational driving unit 3 includes the tool chuck 3A for gripping the grip portion 2A of the rotary tool 2 and a spindle motor 3B having the tool chuck 3A fixed to a rotating shaft thereof for rotational driving. The spindle motor 3B is mounted on the press driving unit 4 at an upper end thereof which is opposite to the tool chuck 3A via a mount plate 8. In this case, the spindle motor 3B is fixed to the mount plate 8 at the upper end thereof with fastening tools such as bolts and nuts while compressibly holding the pressure sensor 6 between the mount plate 8 and itself.

The press driving unit 4 includes a servo motor 4A fixed to the mount bracket 5 with a rotating shaft thereof being oriented upwardly, a ball screw shaft 4B rotatably supported on the mount bracket 5 at upper and lower ends thereof, a belt power transmission mechanism 4C for constituting a power transmission between an upper end portion of the ball screw shaft 4B and the rotating shaft of the servo motor 4A, a ball screw nut 4D adapted to thread fit on the ball screw shaft 4B in such a manner as to be movable vertically, a direct driven bearing rail 4E disposed in parallel with the ball screw shaft 4B and fixed to the mount bracket 5 at upper and lower ends thereof and a direct driven bearing 4F adapted to fit on the direct driven bearing rail 4E in such a manner as to be movable vertically therealong and integrally coupled to the ball screw nut 4D. Then, fixed to this direct driven bearing 4F is the mount plate 8 to which the spindle motor 3B of the rotational driving unit 3 is fixed in turn.

The mount bracket 5 has a side wall 5A to which the servo motor 4A is fixed, and an upper wall 5B and a lower wall 5C on which the ball screw shaft 4B and the direct driven bearing rail 4E are supported at the upper and lower ends thereof, respectively. Then, the upper wall 5B is detachably attached to an arm A of a machining robot (not shown) via bolts and nuts.

The pressure sensor 6 includes a piezoresistant element or a piezoelectric polymer and is constructed so as to detect at least a pressure of 300 to 700 kgf. The pressure sensor 6 outputs a detected pressure signal to the control unit 7, which will be described later.

Figure 2:
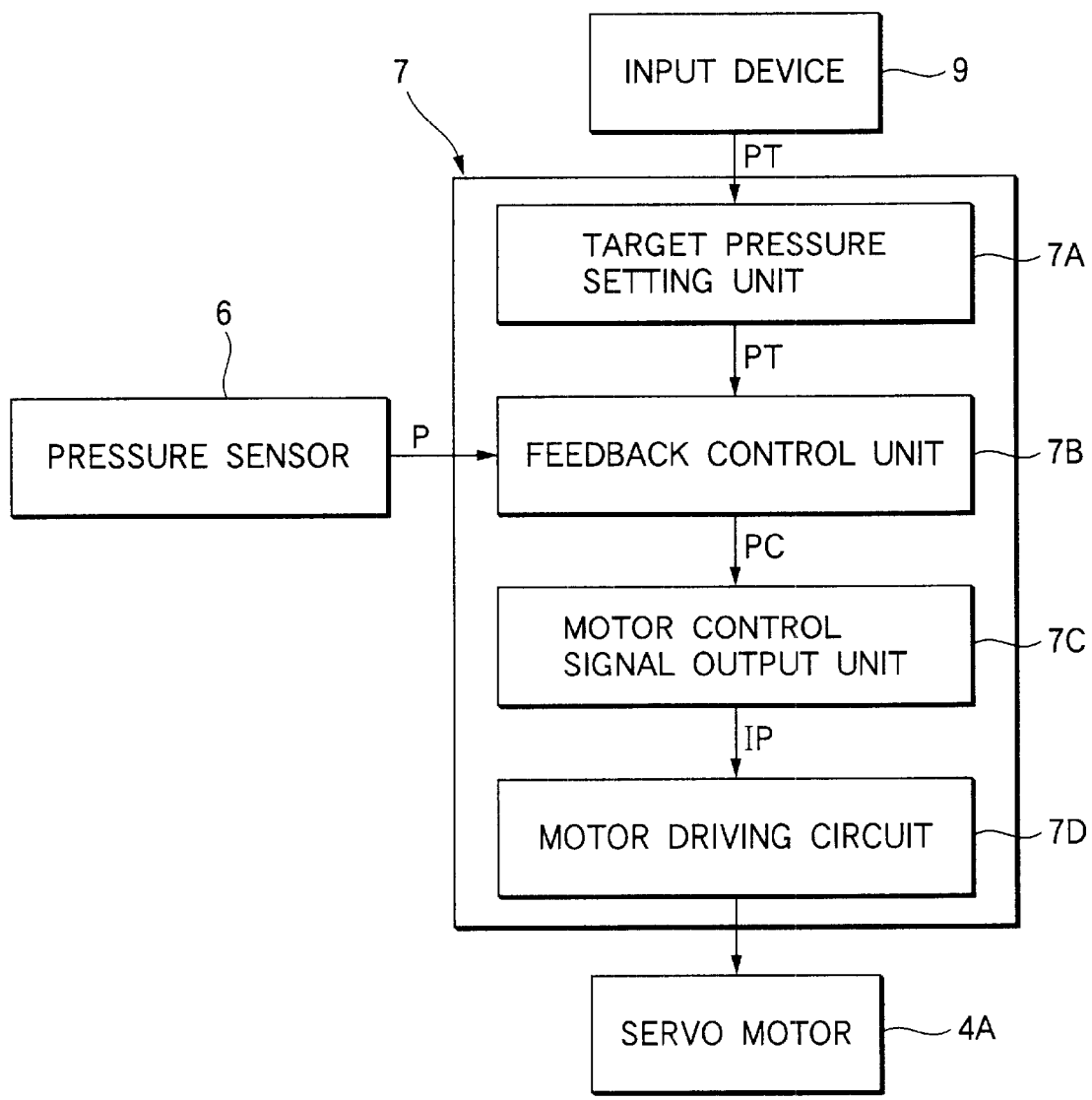
FIG. 2 is a functional block diagram of a control device constituting the friction stir welding apparatus according to the embodiment of the invention.

As shown in FIG. 2, the control unit 7 is adapted to control the rotation of the servo motor 4A of the press driving unit 4 based on input signals from the pressure sensor 6 and an input device 9, and therefore includes a target pressure setting unit 7A, a feedback control unit 7B, a motor control signal output unit 7C and a motor driving circuit 7D. In addition, the control unit 7 includes as a basic hardware configuration a ROM (Read Only Memory) for storing various types of data and programs, a RAM (Random Access Memory) for temporarily storing various types of data and the like and a CPU (Central Processing Unit) for performing various types of operations as well as an input/output interface I/O between the pressure sensor 6 and the input device 9 and an A/D converter for converting an analog signal inputted from the pressure sensor 6 into a digital signal.

A target pressure PT (for example, 500 kgf) in accordance with the material and thickness of the plate-like workpiece W is inputted into the target pressure setting unit 7A from the input device 9 and held therein. In addition, a target pressure PT signal outputted from the target pressure setting unit 7A is inputted into the feedback control unit 7B. An analog signal indicating an actual pressure P detected by the pressure sensor 6 is converted into a digital signal, which is then inputted into the feedback control unit 7B as well.

The feedback control unit 7B performs proportional, integral and differential operations relative to a deviation of the actual pressure P relative to the target pressure PT to thereby produce a PID operation signal PC for quickly converging the deviation to zero and outputs the PID operation signal PC to the motor control signal output unit 7C.

The motor control signal output unit 7C produces a PWM (Pulse Width Modulation) control signal IP for controlling current conducted to the servo motor 4A through pulse width modulation based on the PID operation signal PC from the feedback control unit 7B and outputs the PWM control signal IP to the motor driving circuit 7D.

The motor driving circuit 7D switch-drives a bridge circuit of a power FET (Field Effect Transistor), not shown, based on a PWM control signal IP from the motor control signal output unit 7C to thereby rotationally drive the servo motor 4A with a driving current of a predetermined polarity and duty ratio.

Figure 3:
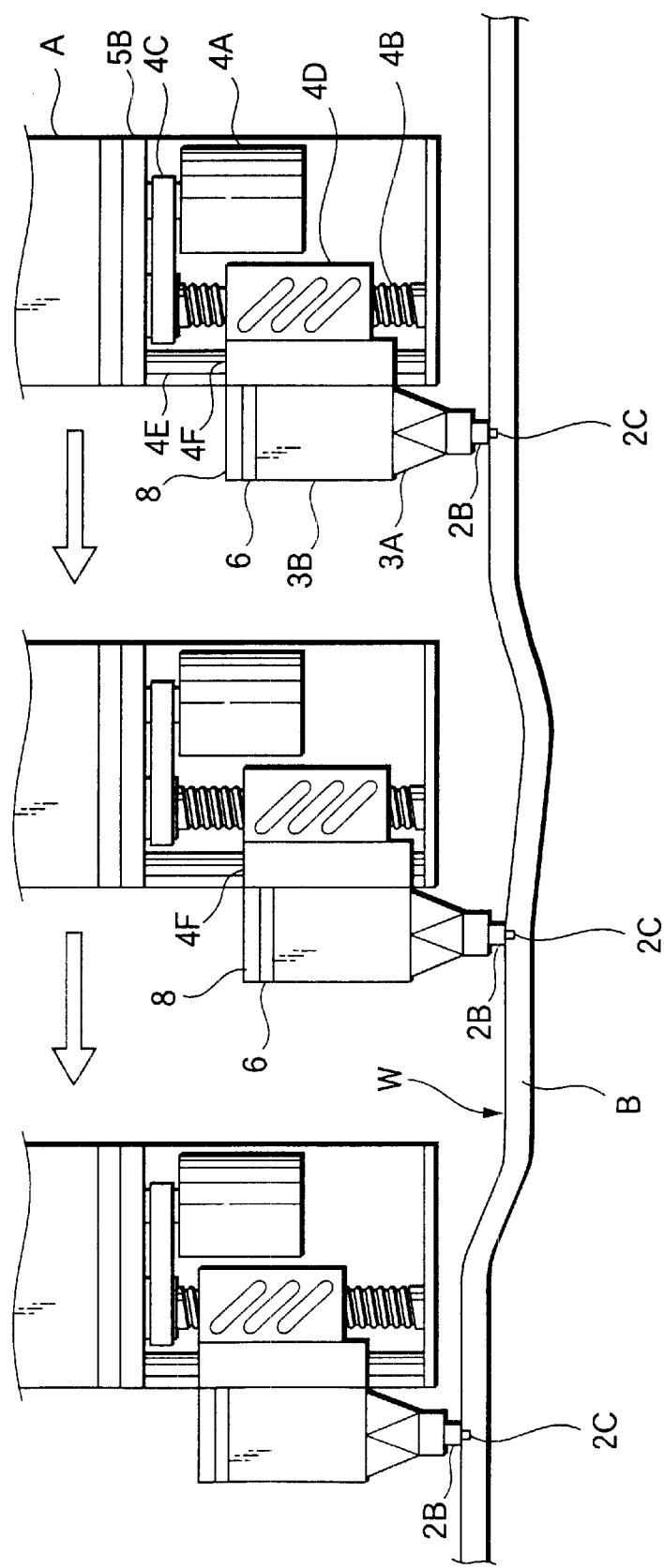
FIG. 3 is an explanatory view explaining an exemplary application of the friction stir welding apparatus according to the embodiment of the invention.

The friction stir welding apparatus 1 constructed as described above is mounted, for example, on a distal end of an arm A of a machining robot at the upper wall 5B of the mount bracket 5 as shown in FIG. 3 for use in welding the welding portion B of the plate-like workpiece W which is formed of aluminum alloy. Note that although the accuracy with which the arm A of the machining robot is re-positioned is not necessarily constant as the arm A is driven by a plurality of servo motors, the friction stir welding apparatus can perform the welding operation properly. An exemplary application of the friction stir welding apparatus according to the embodiment will be described below.

First, the rotary tool 2 of the friction stir welding apparatus 1 is rotated at a high speed of 2000 to 5000 rpm with the spindle motor 3B. In this state, the machining robot (not shown) controls the arm A thereof so as to be lowered, as shown in FIG. 3, toward the plate-like workpiece W so that the probe 2C projecting from the lower end of the rotary tool 2 is inserted into the welding portion B of the plate-like workpiece W and the lower end face of the shank 2B is brought into abutment with the surface of the welding portion B. As this occurs, although it is preferable to form in advance an insertion hole for the probe 2C in the welding portion B, even in a case where such an insertion hole is not so opened, the probe 2C can soften the welding portion B by virtue of friction heat generated when the probe 2C rotates at high speed against the welding portion B, and the probe 2C can easily be inserted into the welding portion B which is being so softened.

When the probe 2C of the rotary tool 2 is inserted into the welding portion B of the plate-like workpiece W and the lower end face of the shank 2B comes into abutment with the surface of the same portion, a reaction force from the surface acts on the pressure sensor 6, which then detects the pressing force of the shank 2B relative to the surface of the welding portion B. Then, at the control unit 7, the feedback control unit 7B outputs a PID operation signal PC for converging an actual pressure P to a target pressure PT set, for example, at 500 kgf to the motor control signal output unit 7C based on the target pressure PT inputted from the target pressure setting unit 7A and the actual pressure P inputted from the pressure sensor 6. Then, the motor control signal output unit 7C outputs a predetermined PWM control signal IP to the motor driving circuit 7D, which then rotationally drives the servo motor 4A with a driving current of a predetermined polarity and duty ratio.

In the friction stir welding apparatus 1, the servo motor 4A rotationally drives the ball screw shaft 4B clockwise or counterclockwise via the belt transmission mechanism 4C through the control by the control unit 7, whereby the ball screw shaft 4B raises or lowers the direct driven bearing 4F together with the ball screw nut 4D along the direct driven bearing rail 4E and the direct driven bearing 4F raises or lowers in turn the rotary tool 2 together with the spindle motor 3B and the tool chuck 3A. Thus, in the event that the actual pressure P detected by the pressure sensor 6 is higher than the target pressure PT, the rotary tool 2 is driven to rise, whereas in the event that the actual pressure P is lower than the target pressure PT, the rotary tool 2 is driven to lower. Thus, the rotary tool 2 is controlled so as to converge the actual pressure P to the target pressure PT.

Then, as shown in FIG. 3, the machining robot controls the arm A thereof so that the arm A travels along the line of the welding portion B of the plate-like workpiece W, whereby the probe 2C of the rotary tool 2 of the friction stir welding apparatus 1 is brought into a frictional rotating contact with the welding portion B with a traveling resistance of in the order of 100 kgf, and then the friction heat then generated acts to soften the welding portion B so that the same portion being so softened is allowed to be plastically fluidized in the rear of the traveling probe 2C, the welding portion B being thereby welded when cooled and solidified.

As this occurs, in the friction stir welding apparatus 1 according to the embodiment, the pressure sensor 6 detects the pressing force of the shank 2B of the rotary tool 2 relative to the surface of the welding portion B of the plate-like workpiece W, and the control unit 7 controls the driving of the servo motor 4A so that the pressing force falls within the predetermined range of, for example, in the order of 500 kgf based on the detection signal from the pressure sensor 6. Consequently, the shank 2B of the rotary tool 2 follows the surface of the welding portion B even if the surface of the same portion is irregular or varies in thickness, whereby the amount of insertion of the probe 2c into the welding portion B is maintained constant. Thus, according to the friction stir welding apparatus according to the embodiment, the welding portion B of the plate-like workpiece W can be welded stably and accurately.

In addition, in the friction stir welding apparatus according to the embodiment, since the amount of insertion of the probe 2c into the welding portion B is maintained constant, even if the accuracy with which the arm A of the machining robot is re-positioned is inconstant, the arm A may only have to be traveled linearly along the line of the welding portion B within a plane, whereby the control of the driving of the arm A can be implemented simply and easily.

In the friction stir welding apparatus according to the invention, the pressure sensor detects the pressing force of the shank of the rotary tool relative to the surface of the welding portion, and the control unit controls the driving of the press driving unit so that the pressing force falls within the predetermined range based on the detection signal from the pressure sensor. Owing to this, even if the surface of the welding portion is irregular or varies in thickness, the shank of the rotary tool follows the surface of the welding portion and maintains constant the amount of insertion of the probe into the same portion. Consequently, according to the friction stir welding apparatus of the invention, the welding portion of the plate-like member can be welded stably and accurately.

In the friction stir welding apparatus according to the invention, in a case where the mount bracket is constructed so as to be mounted on the arm of the machining robot, the welding portion of the plate-like member can be welded by mounting the mount bracket on the arm of the machining robot and driving the arm so as to travel the probe of the rotary tool along the welding portion. As this occurs, since the amount of insertion of the probe of the rotary tool into the welding portion is maintained constant, even if the accuracy with which the arm of the machining robot is re-positioned is inconstant, the machining robot only has to drive the arm thereof linearly along the line of the welding portion, whereby the welding portion of the plate-like member can be welded efficiently, as well as stably and accurately.

While only certain embodiments of the invention have been specifically described herein, it will apparent that numerous modifications may be made thereto without departing from the spirit and scope of the invention.

What is claimed is:

1. A friction stir welding apparatus, comprising: a rotary tool for friction stir welding having a shank adapted to be brought into abutment with a surface of a portion of a workpiece which is to be butt welded and a probe adapted to be inserted into said portion to be butt welded for frictionally rotating contact therewith;
   a rotational driving unit on which said rotary tool is mounted, said rotational driving unit rotationally driving said rotary tool;
   a press driving unit on which said rotational driving unit is mounted, said press driving unit pressing said shank of said rotary tool against the surface of said portion to be butt welded;
   a mount bracket supporting said press driving unit;
   a pressure sensor detecting a pressing force exerted on the surface of said portion to be butt welded by said shank of said rotary tool; and
   a control unit controlling the driving of said press driving unit based on a detection signal sent from said pressure sensor such that said pressing force falls within a predetermined range.

2. The friction stir welding apparatus as set forth in claim 1, wherein said mount bracket is attached to an arm of a machining robot.

3. The friction stir welding apparatus as set forth in claim 1, further comprising:
   a mount plate for fixing said rotational driving unit to said press driving unit and imparting said pressing force to said shank of said rotary tool,
   wherein said pressure sensor is held between said mount plate and said rotational driving unit.

4. The friction stir welding apparatus as set forth in claim 1, wherein said pressure sensor is a piezoresistant element.

5. The friction stir welding apparatus as set forth in claim 1, wherein said press driving unit includes:
   a servo motor;
   a ball screw shaft rotatably located in said mount bracket;
   a ball screw nut connected with said rotational driving unit and threadedly reciprocating along said ball screw shaft; and
   a power transmission mechanism constructing a power transmission between a rotating shaft of said servo motor and said ball screw shaft.

6. A friction stir welding apparatus, comprising:
   a rotary tool for friction stir welding having a shank adapted to be brought into abutment with a surface of a portion of a workpiece which is to be butt welded and a probe adapted to be inserted into said portion to be butt welded for frictionally rotating contact therewith;
   a rotational driving unit on which said rotary tool is mounted, said rotational driving unit rotationally driving said rotary tool;
   a press driving unit on which said rotational driving unit is mounted, said press driving unit pressing said shank of said rotary tool against the surface of said portion to be butt welded;
   a mount bracket supporting said press driving unit;
   a pressure sensor detecting a pressing force exerted on the surface of said portion to be butt welded by said shank of said rotary tool; and
   a control unit controlling the driving of said press driving unit based on a detection signal sent from said pressure sensor such that said pressing force falls within a predetermined range, wherein
   said pressure sensor is a piezoelectric polymer.

7. A friction stir welding method for friction stir welding a portion of a workpiece which is to be butt welded, comprising the steps of:
   inserting a probe of a rotary tool, rotationally driven by a rotational driving unit, into the portion to be welded for a frictional rotating contact while bringing a shank of the rotary tool into abutment with the surface of the portion to be butt welded;
   detecting a pressing force exerted on the surface of said portion to be butt welded by said shank of said rotary tool via a pressure sensor disposed between said rotational driving unit and amount plate for fixing said rotational driving unit; and
   controlling said pressing force of said rotary tool based on a detection signal sent from said pressure sensor such that said pressing force falls within a predetermined range.

8. The friction stir welding method according to claim 7, wherein said controlling step performs a feedback control based on said detected pressing force and a target pressure, and moves a press driving unit for pressing said shank of said rotary tool so that said pressing force falls within the predetermined range.

* * * * *